June 8, 1965  F. J. HOFMANN ETAL  3,188,065
SMELTING-FURNACE, PARTICULARLY FOR THE PRODUCTION OF STEEL
Filed March 12, 1963  2 Sheets-Sheet 1

ARCH LIFTING CRANE

Inventors

June 8, 1965  F. J. HOFMANN ETAL  3,188,065
SMELTING-FURNACE, PARTICULARLY FOR THE PRODUCTION OF STEEL
Filed March 12, 1963  2 Sheets-Sheet 2

Inventors
Fritz J. Hofmann
Walter Jean
By Ernest Montague
Attorney

3,188,065
SMELTING-FURNACE, PARTICULARLY FOR THE PRODUCTION OF STEEL
Fritz Justus Hofmann and Walter Hess, Essen-Bredeney, Germany, assignors to Beteiligungs- und Patentverwaltungsgesellschaft mit beschränkter Haftung, Essen, Germany, a corporation of Germany
Filed Mar. 12, 1963, Ser. No. 264,635
Claims priority, application Germany, Mar. 15, 1962, B 66,360
11 Claims. (Cl. 263—33)

The present invention relates to a smelting furnace, particularly for the production of steel from scrap iron and carburization material.

It is known that the open hearth furnace requires high initial costs, a large consumption of refractory working material and long melting periods. It has already been proposed to substitute for the open hearth furnace a furnace equipped with burners which are capable of burning gaseous, liquid or pulverized fuel mixed with oxygen or oxygen enriched air. Such furnace does not require regenerators for the attainment of the high melting temperature and, therefore, does not need equipment for the reversion of the direction of the flow of the gases in the furnace.

It is one object of the present invention to provide a smelting furnace, which is characterized by its great simpilcity due to the elimination of the regenerator, and which simplifies and renders more economical the smelting of steel from scrap iron and carburization material.

It is another object of the present invention to provide a smelting furnace, particularly suitable for the production of steel from scrap iron and carburization material, as for instance, pig iron and anthracite, and which is heated by means of burners for liquid, gaseous or powdered fuels and oxygen or oxygen enriched air.

It is still another object of the present invention to provide a smelting furnace, wherein an opening is provided in the furnace arch for the exhaust of the gases and a movable main flue, which may be, for instance, rollable or swingable, is arranged above the hearth flue. In such a furnace, the flow velocity and the heat content of the waste gases are comparatively low. Thus, the flow velocity of the waste gases has been calculated in a 30 ton furnace having a hearth surface of 12.5 m.$^2$ (a diameter of 4 m.) with a heat absorption of 720,000 kcal./m.$^2$/hr. a flue opening of 2.5 m. inner diameter and a temperature of the waste gases of about 1,600° C., as being about 1 m./sec. For the heat content of the gases an amount of at about 300 kcal./sec.=18,000 kcal./min. results. This heat quantity can be fed through a simple gas flue with small water-cooled surfaces and a small amount of refractory furnace lining into a relatively small waste heat chamber.

With these and other objects in view, which will become apparent in the following detailed descripiton, the present invention will be clearly understood in connection with the accompanying drawings, in which.

Figure 1:
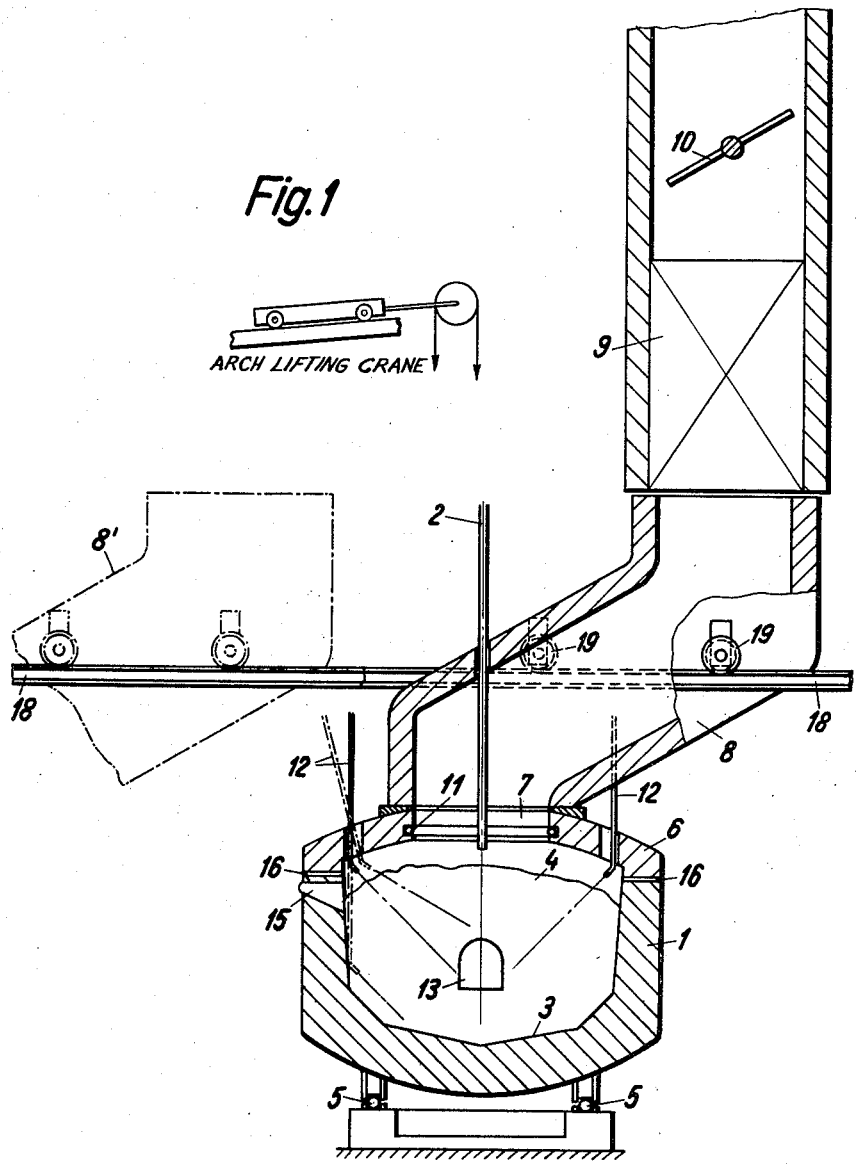
FIGURE 1 is a vertical section of a circular tiltable furnace with a waste heat chamber.

Referring now to the drawings, and in particular to FIG. 1, in the circular furnace 1 a charge 4 disposed on the hearth 3 is melted down by means of the central top burner 2. The furnace 1 is mounted tiltably on rollers 5. The furnace arch 6 is exchangeable and has a centrally disposed opening 7, through which the gases from the furnace are carried to the main flue 8 and fed to the waste heat chamber 9. A shutter flap 10 is provided to regulate the pressure in the furnace. Within the range of the opening 7 the furnace arch 6 is cooled by means of a plurality of cooling pipes 11 by water or steam. In addition to the central top burner 2, further burners 12 are provided, which project through openings of the furnace arch 6 into the interior of the furnace. These burners 12, as well as the central top burner 2, are so constructed, that they are capable of being raised or lowered, as well as tiltable, and can be adjusted according to the smelting charge, for instance, into the positions as indicated by dash-dotted lines. The burners 12, the number of which may be, for instance, four, are preferably disposed near the outer wall of the furnace 1, so that the flame, which is directed from the brim to the center of the furnace 1, may have a possibly long path for its development. A furnace door 13 is provided in the furnace 1. As a rule, a single door will suffice. To observe the smelting processes, peep holes 15 are provided near the burners 12. To charge the furnace upon lifting the top burner 2, the gas flue 8 is rolled off by means of wheels 19 secured to the gas flue 8 and rolling on rails 18 and the furnace arch 6 is lifted. The charge of the scrap iron may then take place in the manner conventional for electric steel furnaces by means of a charging basket. Flux material may be added, for instance, by means of chutes. During the smelting process, the furnace door 13 should remain tightly closed.

The cooling of the furnace arch 6 may also be obtained by means of channels 16 disposed in the furnace wall below the furnace arch 6, through which channels 16 false air may be sucked into the furnace 1 by the prevailing natural draft immediately below the furnace arch 6. For instance, for a 30 ton-furnace having a heat absorption of 720,000 kcal./m.$^2$/hr., eight channels can be arranged over the circumference of the furnace, each channel having a cross-section of about 1 cm.$^2$. If there exists a pressure difference of −1 mm. water column in the interior of the furnace 1 relative to the atmospheric pressure and assuming a length of the channels of about 500 mm., 600 Nm.$^3$ air will flow per hour through these channels. Given an amount of 3120 Nm.$^3$/hr. of the combustion gases, this amounts to about 20% of this quantity. By changing the pressure in the interior of the furnace 1 by means of the shutter 10 or by changing the diameter of the feeding cross-section, the amount of the sucked-in cooling air may be adjusted. This amount may in general be held between 10–20% of the combustion gases.

Figure 2:
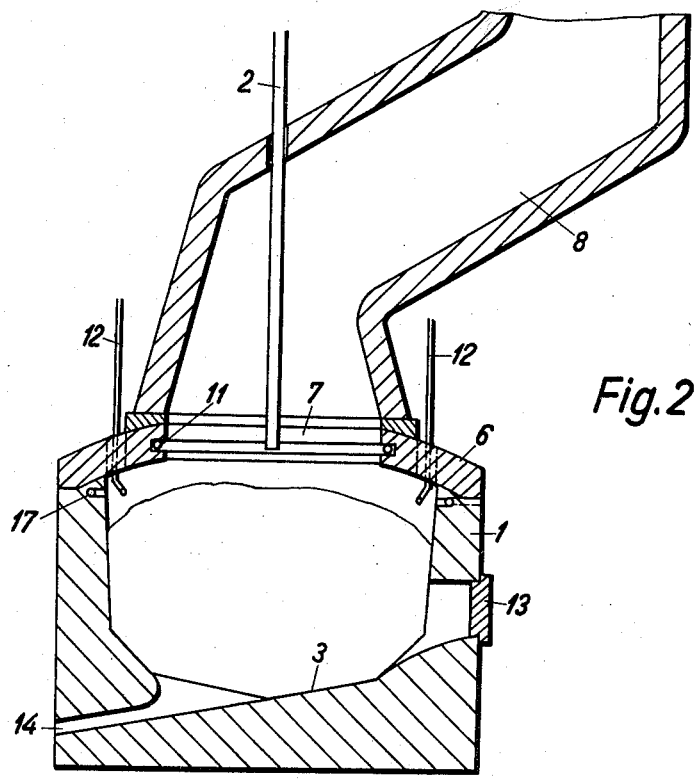
FIGURE 2 is a vertical section of a stationary square furnace.
Figure 3:
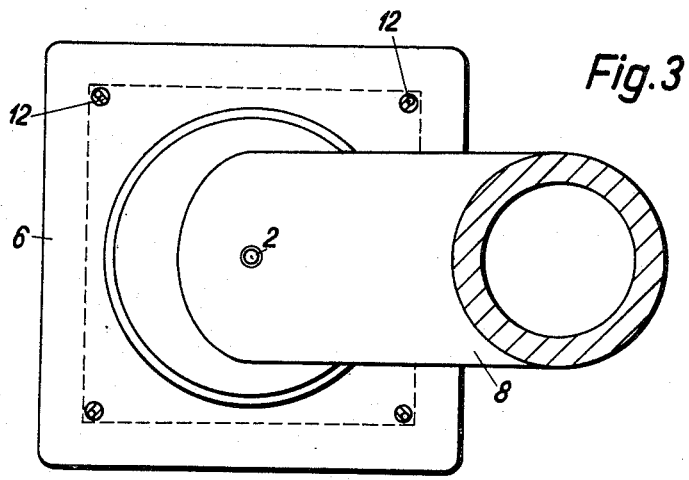
FIG. 3 is a top plan view of the furnace shown in FIG. 2.

Referring now again to the drawings, and in particular to FIGS. 2 and 3, the same reference numbers are applied as in FIG. 1 for the same elements. The furnace shown in FIGS. 2 and 3 is distinguished over that of FIG. 1 mainly by an arrangement, which does not provide tilting thereof and that it has a square base. A further difference resides in that the furnace arch 6 is not removable. The particular advantage of this arrangement resides in the fact that the furnace arch may be formed of highly basic bricks, which are not sensitive to abrupt temperature differences. Besides, it is possible to improve the durability of the furnace arch by blowing pressurized air by means of a pressure conduit 17 distributed about the periphery of the furnace below the furnace arch 6. The pressure of the pressurized air can be adjusted to the pressure prevailing in the furnace.

In the embodiment shown in FIGS. 2 and 3, the burners 12 are disposed in the four corners of the furnace 1, in order to obtain a possibly long flame path.

The laterally arranged burners 12 can be fired particularly during the slag forming period, since the flame has a decisive influence upon the decarburization reaction. This reaction must be maintained for a sufficiently long period and with sufficient intensity, due to its effect upon the quality of the produced steel. The burners 12 may also be applied in addition to or instead of the central top burner 2 for the smelting of the charge. Preferably, in order to avoid the provision of too many burners, burners are applied, the flame cone of which has a large opening angle of, for instance, at least 18°, for example about 30°, and the flame of which is widened preferably in a horizontal direction such, that the spread of the flame in horizontal direction is about 1.5 times, preferably 2 times the spread in the vertical direction. It is advantageous to construct the burners as angle burners and to provide a deviation of the flame cone toward the horizontal direction of at least 5°, preferably 15-30°, so as to bring about a favorable impingement of the flame upon the smelt.

The burners 12 arranged in the manner set forth above have, in addition to the favorable impingement upon the smelt, the further advantage, that the furnace walls are preserved to a very great extent. In addition, the flames, directed towards the center of the furnace, drive the slag towards the center and, thus, decrease the attack of the slag on the fireproof lining of the furnace. The burners 12 join the tilting movement of the furnace, which is carried out by the furnace, in the embodiment in which the burner is mounted for tilting movement.

The furnace, disclosed in the embodiment of FIGS. 2 and 3, the arch of which is not detachable, can be charged with scrap iron, etc. through the opening 7 upon swinging out the flue 8. This operation must be repeated once to thrice, depending upon the nature of the scrap iron. This manner of charging is advantageous in comparison with a single charge, provided that a short heating period, e.g. 5-15 minutes, is provided after each input.

The smelting furnaces according to the present invention have, in addition to structural simplicity and economy, the advantage, that the refractory fettling of the furnace is simple, inexpensive and durable. Furthermore, the charging, as well as the smelting may be carried out speedily and the slag forming operations can be regulated according to the desired results.

While we have disclosed several embodiments of the present invention, it is to be understood that these embodiments are given by example only and not in a limiting sense, the scope of the present invention being determined by the objects and the claims.

We claim:
1. A smelting furnace for the production of steel from scrap iron and carburization material adapted for heating with gaseous liquid or pulverized fuel with oxygen or oxygen enriched air comprising:
   a furnace body having a width greater than its height,
   a plurality of burners extending into said furnace,
   the furnace including an arch having an opening for the exhaust of the waste gases,
   a flue disposed on top of said arch,
   means for removing said flue from its normal operative position above said opening to a lateral inoperative position, and
   means for lifting said arch from the top of said furnace in order to permit the charge of the latter.
2. The furnace, as set forth in claim 1, wherein
said removing means comprises means for rolling said flue into its lateral position.
3. The furnace, as set forth in claim 1, wherein
at least one burner is disposed laterally such that the flame of said one burner is directed obliquely from above to the smelt and towards the center of said furnace.
4. The furnace, as set forth in claim 3, wherein
said burner comprises an angle burner.
5. The burner, as set forth in claim 4, wherein
said burner has a flame cone, the angle of which is at least 18°.
6. The furnace, as set forth in claim 5, wherein
said burner has flame cone, the angle of which is about 30°.
7. The furnace, as set forth in claim 1, wherein at least one burner is disposed laterally such that the flame of said one burner is directed obliquely from above to the melt and towards the center of said furnace, and wherein
said burner has a flame cone, the axis of which forms and angle of at least 5° toward the horizontal direction.
8. The furnace, as set forth in claim 7, wherein
said burner is positioned so that said axis of said flame cone forms an angle of about 15 to 30° toward the horizontal direction.
9. The furnace, as set forth in claim 1, which includes means for tilting said furnace, and
said tilting means include means for joining said laterally arranged burners in the tilting movement of said furnace.
10. The furnace, as set forth in claim 1, which includes a head burner, disposed centrally in said furnace.
11. The furnace, as set forth in claim 1, wherein
said furnace has openings disposed below said arch, and said openings being adapted to feed cooling air into said furnace for cooling said arch.

References Cited by the Examiner

UNITED STATES PATENTS

| | | | |
|---|---|---|---|
| 560,414 | 5/96 | Koneman | 266—35 |
| 725,490 | 4/03 | Schwartz | 263—33 |
| 1,417,588 | 5/22 | Van Amburgh | 266—33 |
| 2,834,157 | 5/58 | Bowes | 263—33 |
| 2,847,206 | 8/58 | McFeaters | 266—35 |
| 2,930,688 | 3/60 | Kalling et al. | 266—35 X |
| 3,002,739 | 10/61 | Lawler | 266—35 |
| 3,015,554 | 1/62 | Rummel | 266—34 X |

FOREIGN PATENTS

| | | |
|---|---|---|
| 194,873 | 1/58 | Austria. |
| 880,584 | 10/61 | Great Britain. |

CHARLES SUKALO, *Primary Examiner.*

JOHN J. CAMBY, *Examiner.*